Figure 1:
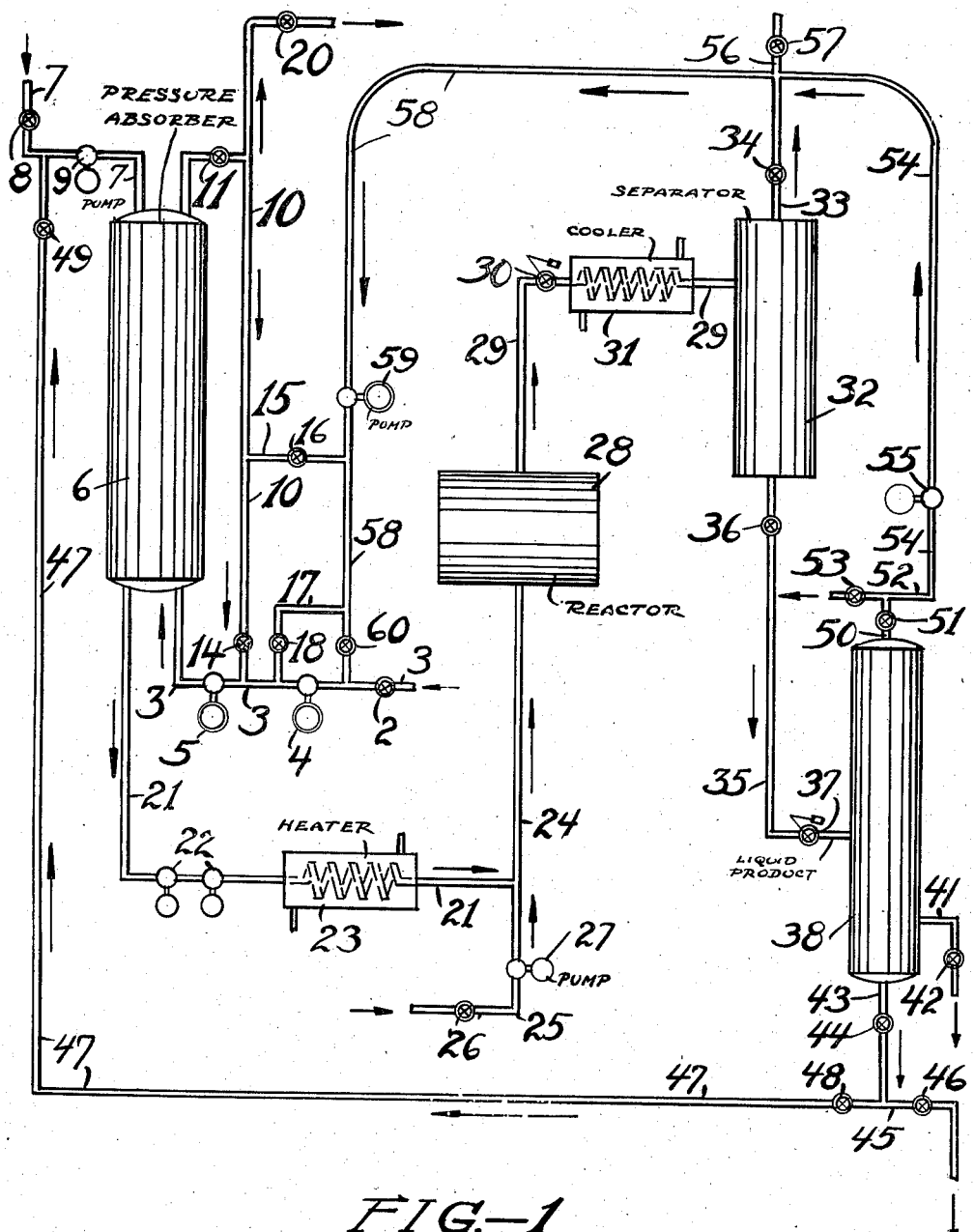

Patented July 3, 1945

2,379,751

UNITED STATES PATENT OFFICE 2,379,751

METHOD OF COMPRESSING GASES AND UTILIZING THE SAME

Francis R. Russell, Elizabeth, N. J., assignor to Standard Oil Development Company, a corporation of Delaware Application January 2, 1941, Serial No. 372,813

12 Claims. (Cl. 196—9)

This invention is concerned with the development and utilization of the so-called "non-condensable" gases in chemical reactions under extremely high pressures. Various reactions have been carried out while employing pressures of the order of around 6000 atmospheres or even up to around 20,000 atmospheres. However, in each of the instances which are known so far the reactions involved related to the chemical reaction of normally liquid compounds such as, for example, in the polymerization of isoprene, in the condensation of isobutaldehyde and normal butaldehyde, in the polymerization of dimethyl butadiene, or the reactions heretofore known have been concerned with the interaction of the so-called "non-condensable" gases one with the other such as, for example, in the synthesis of ammonia by contacting nitrogen with hydrogen under pressures up to about 30,000 atmospheres. However, so far as known at the present time, reactions involving the so-called "non-condensable" gases with substances which are known to be liquids at atmospheric pressures and temperatures represent a problem which up until the present time has not been adequately solved.

One of the chief difficulties in attaining the extremely high pressures heretofore mentioned when working with non-condensable gases exclusively or when working with normally liquid substances in conjunction with non-condensable gases has been in subjecting and maintaining these gaseous constituents under these extremely high pressures. The high pressures are both difficult to secure and expensive to instigate, the more so the higher the pressure attained. Modern gas compressors are seldom mechanically capable of developing pressures much above 1000 atmospheres. It is, however, not such a difficult matter to build and maintain liquid pumps which consume relatively little power and energy as compared to gas compressors and which are capable of hydraulically attaining a pressure of around 5,000 atmospheres or more.

The present invention contemplates the chemical reaction of the so-called "non-condensable" gases, which at ordinary temperatures are considerably above their critical temperature, either with normally liquid compounds or with other non-condensable gases. These gases, for example, may be methane, hydrogen, nitrogen, oxygen, carbon monoxide, carbon dioxide, natural gas, ethane, propane, and other substances which are normally gaseous but which may not necessarily be classified as non-condensable gases. The reactions contemplated involve one or more of the normally gaseous substances heretofore mentioned. In general, the process of the invention may be stated to comprise first dissolving the gas such as, for example, methane, in some liquid absorbent at a pressure relatively easy and economical to attain with an ordinary commercial gas compressor and at a temperature which is usually though not necessarily considerably lower than the temperature at which the ultimate desired reaction is maintained. The fat liquor, that is, the absorbent containing a saturation of the desired gas, for example, methane, may then be relatively easily compressed to the desired high pressure or to a pressure somewhat approaching the desired final pressure under which the reaction is to be carried out. The gas may then be freed of its association with the absorbent by the application of heat and at the same time the freed gas attains the temperature under which the desired reaction is to be maintained. Alternatively, however, it may be stated that in many instances the desired reaction may very conveniently be carried out in the presence of the absorbent or menstruum held at the desired pressure.

A number of substances may be employed as the absorbent or menstruum into which the desired gas or gases are absorbed. For example, the absorbents may comprise gas oil, lubricating oils, tars, especially if they are intended to serve as one of the reactants as well as an absorbent, whale oils, gasoline, kerosene, the other refined oils, and the like. The higher boiling the oil used with the methane or other suitable gas, the higher the pressure at which two phases can be made to exist, or in other words, the sharper the ultimate separation may be especially where the final reaction is carried out essentially in the absence of the original absorbent component. The critical pressures or more exactly the cricondenbars in liquid-gas mixtures are extremely high when the liquid is much higher boiling than the gas, except in cases where the composition is such that the entire system is almost 100% pure liquid or pure gas. "Cricondenbars" are the points of maximum pressure in the phase envelope (the envelope separating the two regions from the single region and consisting of a bubble line and a dew line which meet at the critical point) when plotted on a pressure-temperature phase diagram. The highest approximate pressure at which the gas-liquid phases can exist is attained when employing roughly a 50-50% gas-liquid composition, although this is influenced by the particular gases and liquids selected for use, especially so at the extremely high pressures. Under the extremely high pressures the absorbent may not be one of the above-indicated absorbents but it may be a non-hydrocarbon liquid such as water, the mineral acids, the alcohols such as methyl, ethyl, propyl, isopropyl, the polyhydric alcohols such as the glycols, glycerine and the like. When employing the lighter refined oils as the absorbent, difficulty may be experienced in effecting a subsequent gas-liquid phase separation. However, these materials are desirably employed as reactants and in this case they may serve a double purpose of being reactants and at the same time absorbents for the gases. Also, the higher boiling absorbents such as the tars should not be so high in their boiling points as to solidify when placed under the extremely high pressures. At least, their solidification should not materially alter their fluidity. As is well known, a great many substances, upon the application of extreme pressures thereto, tend to become solids having greatly reduced fluidity, so much so that their use according to the process of the present invention would be materially restricted.

The carrying out of the extremely high pressure reactions of the nature indicated heretofore may be accomplished not only by the application of the extremely high pressures in the manner heretofore indicated but the reactions may also be accelerated by the use of catalysts which are customarily employed in these reactions where the reactions are already known to be operable, said catalysts being of either a solid or a liquid character. But the reactions which are known to be activated solely by the application of heat—the so-called "thermally activated" reactions—are particularly appropriate for usage in accordance with the conception of the present invention. The reactivity of substances such as methane and ethane even under extremely high temperatures, that is, temperatures of the order of 1500–2000° F., is not particularly great but it is within the purview of the present invention to carry out chemical reactions involving the reaction of ethane, methane and substances of similar reactivity by activating these molecules in condensation reactions such as polymerization and alkylation by the application of extremely high pressures, that is, pressures ranging from about 1500 atmospheres to about 12,000 atmospheres. In applying these high pressures to the normally gaseous components of the reaction it is not necessary to secure or to attempt to secure sufficient pressure correlated with temperature upon these compounds in the absorber units so that they are liquefied or intermingled as liquids with the absorbents. It is only necessary that the gases be mechanically absorbed in the absorbent or menstruum in sufficient quantity to insure economical operation and sufficient formation of a gas phase again, if desired, after the fat liquor has been raised to the extremely high pressure and heated to give phase separation. In the absorber, however, a lower pressure is more economical and is justified even though perhaps the attendant absorption is lower than could be attained by the use of slightly higher pressures. This is because of the relative cost of gas compressors as compared with the cost and operation of liquid compressors. The ideal absorption medium is one which has a relatively high solubility affinity for the gas at low pressures and moderate temperatures and which at the same time has a relatively low solubility for that same gas under considerably higher temperatures and pressures.

The process is applicable to a large variety and a large number of different types of organic chemical reactions. Because of its relative inertness, methane is particularly desirable as one of the reactants employed in conjunction with the carrying out of reactions under the present process. Likewise, the treatment of natural gas, petroleum coke, asphalt, coal, rubber, reduced crude bottoms, cracking coil tar and various other carbonaceous solids, liquids and gases including unsaturated compounds such as acetylene, the diolefins such as butadiene, and the monoolefins such as propylene, ethylene, and the like, may be employed. Specifically, the reaction of hydrocarbon gases, for example, methane, with the non-hydrocarbon gases such as oxygen, carbon monoxide or carbon dioxide, to produce aldehydes, alcohols and the like, is contemplated. The treatment of methane with tar or asphalt, the treatment of ethane with $C_4$ paraffins, in particular isobutane, the treatment of normally gaseous olefins such as propylene and the butenes with inorganic oxygen-containing materials such as, for example, water, acids and the like, is specifically contemplated. As previously mentioned, not only are the heretofore mentioned substances utilizable as reactants but they many times serve as reactive absorbents.

The catalysts may be not only liquids or solids such as the Friedel-Crafts type catalysts, either in solid form or dissolved in suitable solvents, for example, tertiary butyl chloride, ethyl chloride and the like, but the catalysts may also be normally gaseous, for example, boron trifluoride. It should be realized, of course, that under the extremely high pressures employed the question of the exact part played by each of the components of the reaction mixture bears little relation to the original intended concept of their part played therein. In other words, butane may not only be a gas employed in the reaction but under the conditions of reaction it will be liquefied, hence it may play the part of an absorbent in the ultimate reaction, it may likewise play the part of a reactant in that reaction, and it may further be a carrier for some catalysts, such as, for example, boron trifluoride or sulfur dioxide, in the ultimate stage of the reaction.

The significant feature of the present invention lies in the fact that gases which are normally noncondensable may be activated to a sufficient extent to cause reaction between themselves and other chemical compounds or chemical elements under extremely high pressures to attain highly desirable final products. In order to economically subject such gases in the presence of suitable reactants, therefore, to the desired reaction conditions, the invention is designed to accomplish this with a minimum of expense and labor.

The necessary equipment for the carrying out of reactions under the extremely high pressures required, particularly in the case of reacting methane, is fairly well recognized at the present time. The absorbers required for effecting the initial absorption of gases in some suitable liquid under moderate temperatures and pressures are readily available to those working in the art. Greater care, however, is necessary in designing and fabricating the valves, pipes, separators, heaters and reactors which constitute the set-up of the extremely high pressure portion of the process. A great deal is known of the types of valves, plungers, intensifiers, reaction chambers and the like due to the high development of technique by Bridgman and his co-workers as set forth in his book, "The Physics of High Pressure." As pointed out by Bridgman in his work, the use of hydrogen under extremely high pressures is rather difficult due to the attack of the hydrogen on the steel forming the walls of the various pieces of equipment employed. The attack of hydrogen may be minimized, though not entirely eliminated, by lining the various portions of the apparatus coming in contact therewith with copper, or some suitable chemically resistant alloys such as, for example, high chrome, chrome-molybdenum or chrome-silicon steels may be employed where pressures of around 3,000 to 5,000 atmospheres are employed and where free or elemental hydrogen is present in the reaction system.

Figure 2:
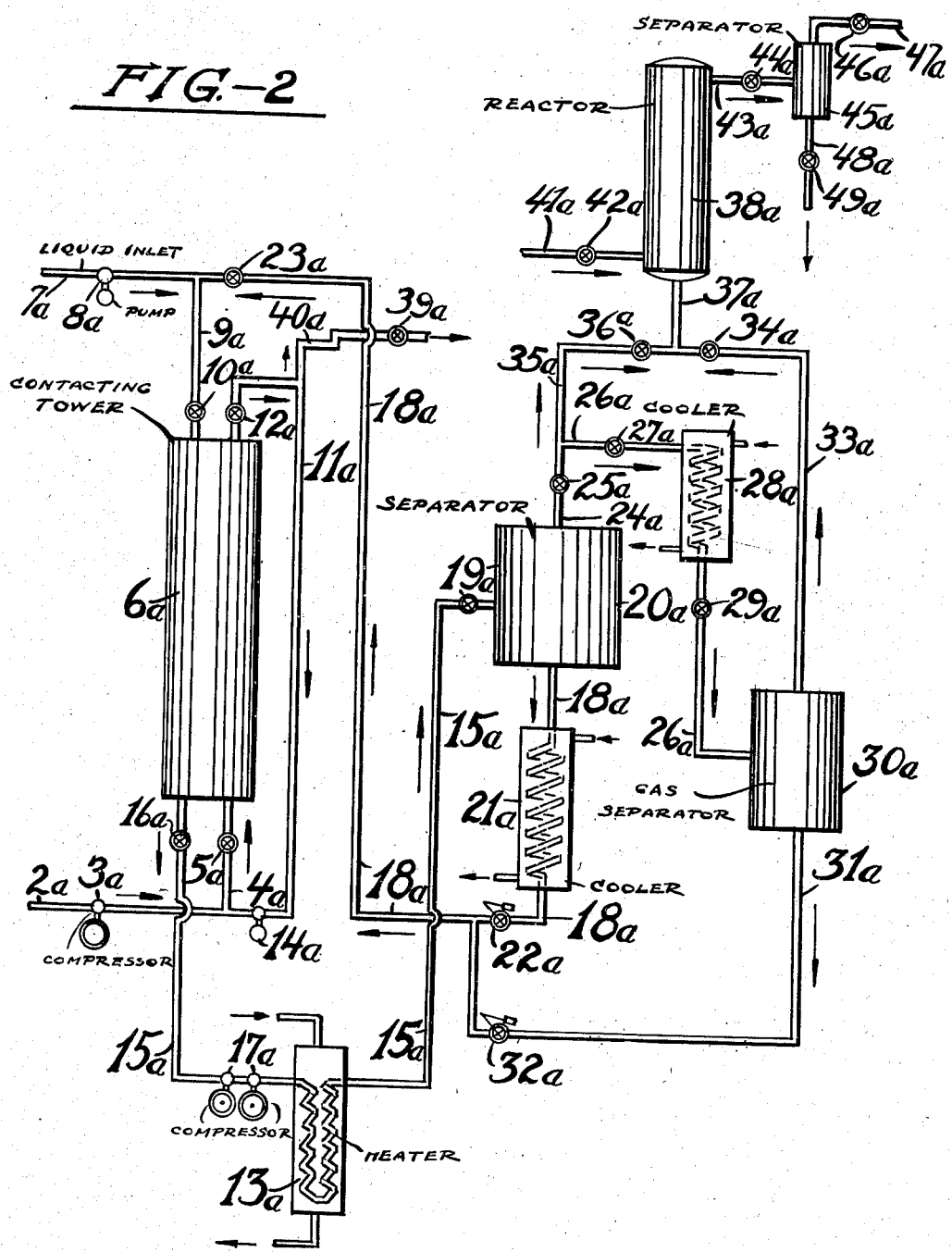

Figs. 1 and 2 of the accompanying drawings consist of diagrammatic representations in sectional elevation of two types of equipment which may be employed in carrying out reactions according to the process of the present invention.

Figure 3:
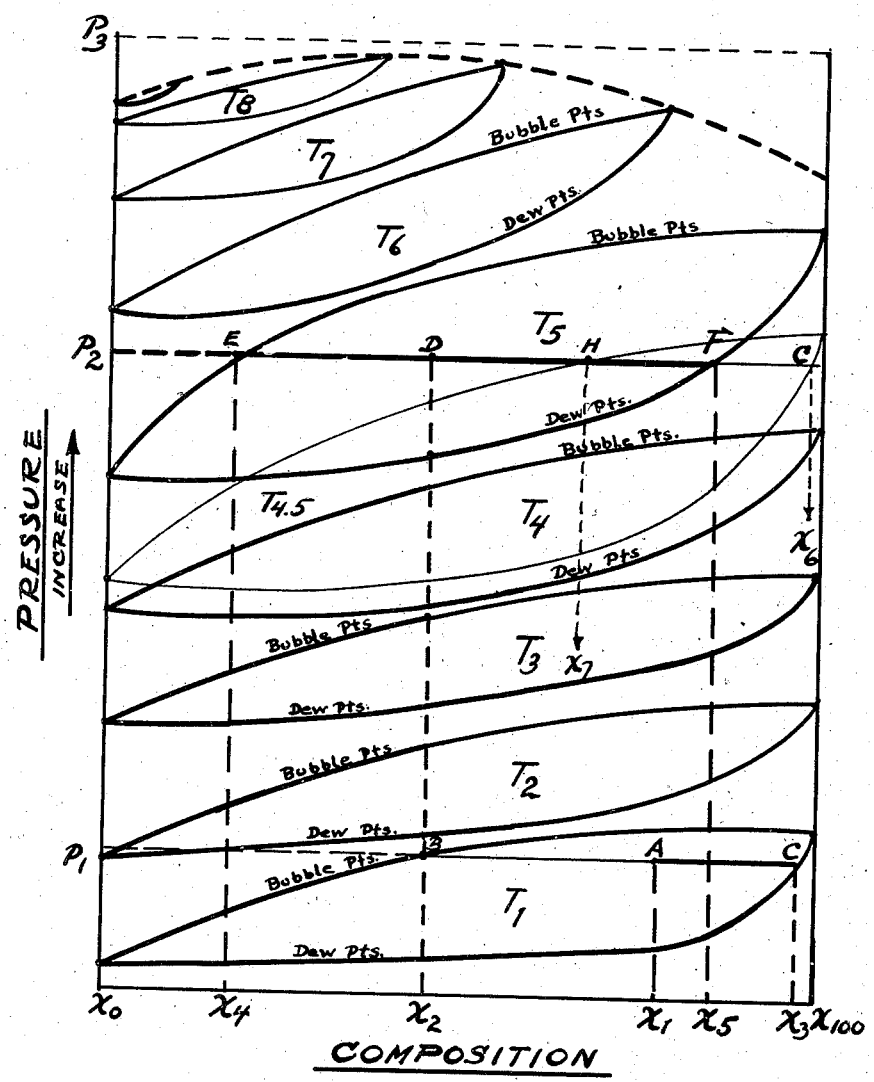

Fig. 3 represents a plotted phase diagram of the various compositions contained in the various portions of the apparatus disclosed in Fig. 2 and will be explained in connection therewith.

Referring now to Fig. 1, the operation of a high pressure process in accordance with the present invention will be explained for the sake of simplification in connection with the carrying out of a methanization reaction involving the use of methane as a non-condensable gas and cracking coil tar from the thermal cracking of crude petroleum fractions as the absorbent medium involved. It will be understood, of course, that the cracking coil tar is definitely not an inert absorbent. However, the explanation of Fig. 1 may also be equally applicable to an inert absorbent. The methane is introduced into the initial absorbent system by means of pipe 3 controlled by valve 2 and compressors 4 and 5. The cracking coil tar, at a temperature sufficient to insure its fluidity, is introduced into the absorber 6 by means of pipe 7 controlled by valve 8 and pump 9. The commingling of the liquid and gas at temperatures ranging between about −30° F. and about 200° F. and pressures ranging between about 3 and about 1,000 atmospheres secures the high degree of solubility of the methane in the cracking coil tar. The lower temperatures are not particularly desirable especially when employing the heavier oils which have a tendency to crystallize wax or in other ways unduly increase their viscosity. It is preferred to maintain the temperature of the absorber between 0° F. and 100° F. usually and between 30 and 300 atmospheres. The temperature, however, depends largely upon the type of absorber employed and the pressure is usually maintained at the highest possible and the temperature at the lowest possible figures consistent with practical operation of the absorber. Any unabsorbed methane is conducted from absorber 6 through pipe 10 and is permitted to exit through valve 11. This unabsorbed methane may then be recycled by means of line 15, pump 5, and line 3 back to the absorber for further contact with the cracking coil tar. Impurities or other gases unabsorbed exit through bleeder valve 20. The fat cracking coil tar may be admixed with further quantities of pure gas or of recycled gas from the process by introducing the same into line 58 by means of pipe 15 controlled by valve 16. Depending upon the pressure at which these tail gases are returned the the absorption unit, the path of the recycled gases may either go through compressor 4 or bypass the same. Means for by-passing the same include the closing of valve 60 and the opening of valve 18 so that the gases are introduced into line 3 by means of line 17. If the compressor 4 is intended to be utilized, valve 18 is closed and valve 60 is opened. The fat liquor coming from absorber 6 is conducted by means of pipe 21 to a single or multi-stage intensifier unit represented by numeral 22 which increases the pressure to a pressure between about 2,000 and about 7,000 or even as high as 12,000 atmospheres. After this pressure has been attained, the fat liquor may be optionally subjected to a heat treatment by means of heater 23. However, under these extremely high pressures it has been found that this heat treatment is not always necessary and that the reaction will go without further heat in many instances. In the event that it is desired to maintain the gas in the absorbent the heater should not be maintained at a temperature sufficient to effect a phase separation under the pressures maintained. The liquid together with its absorbed methane under the extremely high pressure is then conducted by means of line 24 into reactor 28. Reactor 28 may be provided with a series of turbo mixers or jets or other suitable agitation equipment not shown in the drawings. If desired, a further liquid reactant such as, for example, $C_4$ hydrocarbons, water or various other substances heretofore mentioned such as catalysts, for example, boron trifluoride, aluminum chloride and the like, may be introduced by themselves or in suspension in an inert substance or in the cracking coil tar by means of line 25 controlled by valve 26 and motivated by pump 27 into contact with the methane contained in the cracking coil tar so that the reaction takes place in reactor 28. In connection with the use of boron trifluoride, a method similar to that employed and herein described in connection with methane may be employed in introducing boron trifluoride to the reaction zone. If desired, in reactor 28, the construction thereof may be such as to embody a time tank or the reactor may contain a bed of catalyst similar to ordinary continuous catalytic operations. The reacted mixture is then conducted by means of line 29 through a pressure release valve 30 and if desired through cooler 31 into a separator 32. The cooler may be used principally for effecting a separation of phases. This is particularly desirable where a continuous type of operation is carried out, and where gases are to be recycled the pressure is reduced by means of valve 30 only sufficiently to effect a phase separation when coupled with the cooling effect and other optimum conditions maintained in separator 32. The gas evolved from separator 32 is conducted from the separator by means of line 33 controlled by valve 34. It may either be vented by means of line 56 controlled by valve 57 or it may be returned to the absorption unit 6 by means of line 58 and compressor 59. The liquid flowing from separator 32 is conducted to a fractionating tower 38 by means of line 35 controlled by valve 36. A further pressure release valve 37 is incorporated in this line in order to effect a further separation of gaseous products from the desired products. Fractionating tower 38 may be operated in any number of conventional ways as desired by the operator in order to secure the most useful products.

Diagrammatically, fractionator 38 is now represented as obtaining only a desired product from line 41 controlled by valve 42. The residue may either be returned to cracking coil tar feed line 7 by means of lines 43 and 47 controlled by valves 44, 48 and 49 or it may be discarded by closing valve 48 and permitting the residue to be withdrawn by means of line 45 controlled by valve 46. The gas evolved from fractionator 38 may be withdrawn from the system through lines 50 and 52 controlled by valves 51 and 53. On the other hand, it is more likely that these gases find further use in the absorber 6, hence valve 53 is closed and by means of line 54 and compressor 55 these gases, with pressure similar to the gases evolved through line 33, are combined with those gases by line 33, fed by line 58 controlled by valves 18 and 60, back to the absorption unit 6 by means of pipe 3 which contains the initial methane feed stock.

The product coming from line 41 controlled by valve 42 may be any number of desired products depending upon the actual chemical reactions taking place in reactor 28. Usually, however, large quantities of aromatics and branched chain paraffinic hydrocarbons may be obtained by this process when employing exclusively methane and cracking coil tar as the reactants in the process. On te other hand, if water is introduced into the system by means of line 25, methyl alcohol may be one of the products of the reaction which is desirably recovered. Furthermore, if only methanation conditions are maintained in the reactor 28, little side-stream product may be obtained from line 41 but instead the "tar" removed through lines 43 and 45 and valves 44 and 46 will be found to be more nearly chemically saturated that is, have a higher hydrogen to carbon ratio and suitable for use as a source of wax or for cracking feed stocks.

By omitting pressure release valves 36 and 37 from the system no further quantities of gas will be evolved and a light fraction may accordingly be withdrawn from fractionating tower 38 through lines 50 and 52. This is sometimes of use where it is desired to economize on the power necessary to attain the high pressures under which the final products may be and especially where the lighter fractions are to be employed in the same or a subsequent high pressure reaction.

Figure 2 represents a type of high pressure system designed to carry out chemical reactions involving the same type of reactants as referred to previously in this disclosure but wherein the ultimate chemical reaction is carried out substantially in the absence of an absorbing medium. Of necessity the absorbent employed in absorbing tower 6a is therefore relatively inert with respect to the gas being subjected to the extremely high pressures. Depending upon the gas employed, the absorbents which are liquid under the absorption conditions may vary. Thus, for example, as heretofore indicated, cracking coil tar, asphalt, naphthas, kerosene, the refined oils, the white oils, and various types of hydrocarbon petroleum fractions may be employed as an absorbent medium. For purposes of illustration, the reaction will be considered in connection with reaction of methane with a C₄ olefin such as, for example, isobutene. The absorbent for the methane will be a heavy gas oil similar to that produced in thermal cracking operations. The methane is introduced into absorber 6a by means of pipe 2a and compressor 3a, pipe 4a and valve 5a. Flowing downwardly through the contacting tower or absorber 6a, the gas oil which is introduced by means of pipe 7a and pump 8a into line 9a controlled by valve 10a is intimately mixed with the methane under a pressure of between about 100 and about 800 atmospheres and at a temperature preferably between about 0° F. and 100° F. Any undissolved methane is withdrawn through line 11a controlled by valve 12a. Unabsorbed gases which may or may not contain impurities may either be recycled to absorber 6a by using lines 11a and 4a, controlled by valves 12a and 5a and compressor 14a, or they may be bled from the system by means of bleeder valve 39a. Partially fat liquor is recycled to the absorption unit by means of lines 18a and 9a and valves 23a and 10a. The fat liquor evolved from tower 6a by means of line 15a controlled by valve 16a is subjected to the action of a single or multistage intensifier or pump 17a where the pressure is raised to between about 400 and about 3500 atmospheres and if desired the fat liquor is then subjected to the desired amount of heat which may, for example, be between about 200° F. and about 600° F., the temperature actually being at least sufficient to effect a phase separation under the particular pressure maintained, and the resulting fat liquor is then conducted by means of line 15a controlled by valve 19a into a hot separator 20a wherein the methane which has separated but which may contain some entrained gas oil may then follow one of two paths. It may go by means of lines 24a and 26a controlled by valves 25a, 27a and 29a through a cooler to a further gas purifier or separator 30a where most of the entrained or dissolved gas oil is removed by means of line 31a and the relatively gas-oil-free methane may then be conducted by means of line 33a controlled by valve 34a through line 37a into reactor 38a, or if the phase separation is sufficiently sharp in separator 20a the methane may go directly by means of line 35a controlled by valve 36a through line 37a to reactor 38a. Reactor 38a is quite similar in construction to reactor 28 and is maintained under reaction conditions similar to those of reactor 28 as described in Fig. 1. Inlet pipe 41a controlled by valve 42a diagrammatically represents the connection between a high pressure unit in which the C₄ olefinic hydrocarbons such as, for example, normal or isobutene, have been subjected to the proper degree of heat and pressure treatment so that they are substantially the same as that of the methane entering reactor 38a. Pipe 41a therefore serves simply as an inlet for isobutene and/or normal butene into reactor 38a, which may or may not contain a catalyst for the reaction such as, for example, aluminum chloride or a concentrated mineral acid such as sulfuric acid of about 98% strength. The product of the reaction passes through line 43a controlled by valve 44a into a primary separator wherein a rough separation of phases may take place. Valve 44a may if desired be a pressure release valve so that the unreacted reactants coming from the reaction chamber may pass through line 46a controlled by valve 47a and may either be sent to a separation unit such as a fractionating tower to effect a separation of C₄ olefins from methane, wherein the methane and C₄ olefins may be returned to the respective feed stock inlets in the system or the constituents evolved from the separator 45a through line 46a may comprise a light fraction of the products of the reaction as well as the unreacted reactants. Usually line 48a controlled by valve 49a contains the residue and the bulk of the desired product which may be subjected to any suitable desired conventional fractionating treatment. The gas oil which has been precipitated out in separator 20a and gas separator 30a and which has been cooled by coolers 21a and 28a roughly to the temperature maintained in contact tower 6a passes through pressure release valves 22a and 32a and is returned to the contact tower 6a by means of lines 18a and 9a controlled by valves 23a and 10a.

Fig. 3 represents a more or less theoretical phase diagram showing the relative composition of gas and absorbent media in the various parts of the system represented by Fig. 2. Thus, for example, $X_0$ represents the gas oil and $X_{100}$ represents methane. Upon feeding $X_{100}$ and $X_0$ to contact tower $6a$ maintained under a pressure of $P_1$ and temperature $T_1$ the constituents of pipe $11a$ are represented by $X_3$, the constituents of pipe $15a$ are represented by $X_2$ and the constituents being evolved from heater $13a$ represent conditions of $P_2$ and $T_5$, indicating the increased pressure together with a rise in temperature represented on the diagram of Fig. 3 by $T_1$ going to $T_5$. The composition $X_2$ eventually and by means of line $15a$ enters separator $20a$ which is maintained for illustrative purposes at pressures $P_2$ and temperature $T_5$. The gas oil from this hot separator which emerges through line $18a$ is represented by $X_4$ and the temperature of cooler $21a$ is represented by $T_1$. $X_4$ is the composition of the gas oil being returned through line $18a$ to contact tower $6a$. $X_5$ represents the composition of the contents of pipe $24a$ going to reactor $38a$. If, on the other hand, the methane which contains dissolved or entrained gas oil is subjected to further gas purification by being conducted through line $26a$ and cooled to some temperature, say, $T_{4.5}$, the composition $X_5$ is altered so that the effluent from gas separator $30a$ through line $33a$ is represented by a composition $X_6$ where the pressure is still maintained at $P_2$ and where the cooler $28a$ may be maintained at $T_{4.5}$. The composition leaving gas separator $30a$ through line $31a$ is represented as $X_7$ on the phase diagram. This is returned to the contact tower $6a$. The methane entering the reactor $38a$ by means of pipe $37a$ is represented either as a composition $X_5$ or $X_6$ depending upon the treatment heretofore outlined and the gas of this composition is maintained at a pressure of $P_2$ and at a temperature of $T_{4.5}$ or $T_5$.

It should be pointed out here that Fig. 3 has been more or less simplified for the sake of clarity in explanation. Actually, the phase boundary loops would have a much greater slope, particularly near the ordinate $X_{100}$, so that the temperature designated $T_{4.5}$ might actually be as low as the absorption temperature $T_1$ and still permit a phase separation when the methane was cooled from $T_5$.

With ethane or heavier hydrocarbons similar processes can be used but pressures when using hydrocarbon solvents need not be as great as for methane.

In view of the known high solubility of even the lightest hydrocarbons in other hydrocarbons, even the very heavy and aromatic ones, and the near impossibility of producing two phases in such mixtures at pressures much above 1500 atmospheres regardless of the temperature employed, the process pictured in Figs. 2 and 3 is limited to a final pressure $P_2$ of about 1500 atmospheres or less unless an absorbent other and more polar than a hydrocarbon is used. Depending upon the final pressure at which it is desired to separate two phases, water, various alcohols, ethers, etc., can be employed as the absorbent, or mixtures of the same with themselves or with hydrocarbons can be used. For the extremely high pressures mentioned earlier, an absorbent composed of a mixture of an alcohol and water is ideal.

Having thus fully described and illustrated the character of the invention, what is desired to be secured by Letters Patent is:

1. A process which comprises absorbing at least one non-condensable gas in a liquid absorbent at a temperature between about $-30°$ F. and about 200° F. under a pressure between about 2 and about 1000 atmospheres, subjecting the fat liquor to an additional pressure of between 2000 and about 12,000 atmospheres subsequently adjusting the temperature between about $-30°$ F. and about 800° F. and chemically reacting the non-condensable gases under these conditions.

2. A process as in claim 1 wherein the temperature maintained within the $-30°$ F. to 800° F. range is maintained sufficiently high and pressure sufficiently low to effect a substantial phase separation of gas from liquid prior to instigating and apart from any substantial chemical reaction involving the gas.

3. A process which comprises absorbing methane in at least one organic absorbent liquid at a temperature between about 0° F. and about 100° F. under a pressure between about 30 and about 300 atmospheres, subjecting the resultant fat liquor to a pressure of between about 2000 and about 10,000 atmospheres and then an increased temperature between about 100° F. and about 700° F. for a sufficient length of time to effect a substantial methanization of at least one organic liquid absorbent under the resulting ultimate extreme pressure.

4. A process as in claim 3 wherein the absorbent comprises a tar.

5. A process as in claim 3 wherein the absorbent comprises asphalt.

6. A process as in claim 3 wherein ethane is substituted for methane.

7. A process which comprises absorbing methane in at least one hydrocarbon absorbent medium liquid at a temperature between about 0° F. and about 100° F. under a pressure between about 30 and about 300 atmospheres, subjecting the resultant fat liquor to a pressure between about 2,000 and about 10,000 atmospheres and then at an increased temperature between about 100° F. and about 700° F. for a sufficient length of time to effect a substantial methanation of at least one hydrocarbon absorbent present under the resulting ultimate extreme pressure.

8. A process as in claim 7 wherein the temperature in the ultimate extreme pressure zone is only sufficiently high to effect a phase separation, the methane being conducted to a reaction chamber maintained under the ultimate extreme pressure and reacted with at least one constituent derived from petroleum.

9. A process as in claim 7 wherein methane is reacted with a $C_4$ hydrocarbon.

10. A process as in claim 7 wherein methane is reacted with a $C_4$ olefinic hydrocarbon.

11. A process as in claim 7 wherein ethane is substituted for methane.

12. A process which comprises absorbing methane in at least one organic absorbent liquid at a temperature between about 0° F. and about 100° F. under a pressure between about 30 and about 300 atmospheres, subjecting the resultant fat liquors to a pressure of between about 2,000 and about 10,000 atmospheres and then at an increased temperature in the ultimate extreme pressure zone substantially only sufficiently high to effect a substantial phase separation between the methane and absorbent liquid, conducting the methane under the ultimate extreme pressure to a reaction chamber maintained under the same pressure and reacting the same with at least one constituent derived from petroleum.

FRANCIS R. RUSSELL.